United States Patent [19]

Hintze-Brüning et al.

[11] Patent Number: 5,792,827

[45] Date of Patent: Aug. 11, 1998

[54] ADDITION PRODUCTS, RADIATION-CURABLE SURFACE COATING COMPOSITIONS BASED ON THE ADDITION PRODUCTS AND THEIR USE FOR WOODCOATING AND PAPERCOATING

[75] Inventors: Horst Hintze-Brüning; Klaus Cibura; Wolfgang Baltus, all of Münster, Germany

[73] Assignee: BASF Lacke + Farben, AG, Muenster-Hiltrup, Germany

[21] Appl. No.: 514,528

[22] Filed: Aug. 14, 1995

Related U.S. Application Data

[63] Continuation of Ser. No. 180,742, Jan. 13, 1994, abandoned.

[51] Int. Cl.⁶ .................................................. C08G 69/26
[52] U.S. Cl. .................... 528/332; 528/363; 528/392; 428/100; 428/510; 428/511
[58] Field of Search ..................... 528/332, 363, 528/392; 428/500, 510, 511

[56] References Cited

U.S. PATENT DOCUMENTS

| | | | |
|---|---|---|---|
| 4,045,416 | 8/1977 | Robson et al. | 260/77.5 CR |
| 5,180,424 | 1/1993 | Hutter | 156/25 R |

*Primary Examiner*—Duc Truong

[57] ABSTRACT

The present invention relates to addition products of

A) oligomers having at least two acrylic ester and/or methacrylic ester groups per molecule and B) diamines having a primary and a tertiary amino group, the ratio of primary amino groups of B) to the (meth)acrylic double bonds of A) being 0.01:1 to 0.2:1, preferably 0.03:1 to 0.1:1.

The invention also relates to processes for the preparation of the addition products, to radiation-curable surface coating compositions based on the addition products and to the use of the surface coating compositions for woodcoating and papercoating.

9 Claims, No Drawings

ADDITION PRODUCTS, RADIATION-CURABLE SURFACE COATING COMPOSITIONS BASED ON THE ADDITION PRODUCTS AND THEIR USE FOR WOODCOATING AND PAPERCOATING

This is a continuation of application Ser. No. 08/180,742 filed on Jan. 13, 1994, now abandoned.

The present invention relates to addition products of
A) oligomers having at least two acrylic ester and/or methacrylic ester groups per molecule and
B) polyamines.

Furthermore, the present invention relates to radiation-curable surface coating compositions based on he addition products and to the use of the radiation-curable surface coating compositions for the coating of wood, woodbase materials and paper.

Curing of compositions based on acrylic esters by radiation, in particular UV radiation, is known. However, the problem with this method is that the presence of air interferes with surface-hardening.

Photopolymerizable surface coating compositions containing amines as reducing agents or chain-transferring compounds are disclosed in German Patent Specification 2,625,538. The disadvantage of using such a free amine is that it can act as plasticizer and leads to an undesirable deposit on the surface and to odor nuisance.

By incorporating the amino group in a molecule which additionally contains polymerizable groups it is possible, on curing, to obtain an amine which is present as copolymerized units and does not show the abovementioned disadvantages. A known method of incorporation is the addition of amines to molecules which are high in double bonds, which addition proceeds analogously to a Michael addition and is described, for example, in F. Möller, Houben-Weyl, Vol. 11/1 (1957), pp. 277–280. U.S. Pat. No. 2,759,913 teaches the addition reaction of amines with activated, olefinically unsaturated compounds, such as acrylates, in equimolar amounts, which results in complete conversion of the activated ethylenic double bonds. Systematic investigations on the addition reaction of amino alcohols with acrylates have been carried out by N. Ogata and T. Asahara, Bull. Chem. Soc. Jap. 39, pages 1486–1490, 1966.

German Patent Specification 2,346,424 describes the preparation of radiation-curable compositions, starting from acrylic esters of polyhydric alcohols and secondary, aliphatic monofunctional amines. These compositions have the disadvantage of reduced shelf life. Moreover, the addition reaction of a secondary amine leads to a reduction in acrylic ester functionality of the molecule and thus also to a reduction in crosslinking possibilities for the radiation-induced polymerization.

Addition products of esters of acrylic or methacrylic acid and polyhydric alcohols with primary monoamines, in which the molar ratio of monoamine to (meth)acrylic double bond of the ester is 0.05:1 to 0.4:1, are disclosed in EP-A-280,222.

The addition products according to EP-A-280,222 are used in radiation-curable compositions which harden in air. However, the shelf life of the products disclosed in EP-A-280,222 is insufficient. Thus, upon storage of the addition products, a significant increase in viscosity is observed. Furthermore, addition products of tetrahydric polyols with primary monoamines give rise to compatibility problems. Products of this type have a cloudy or milky-white appearance. A further disadvantage of the amine-modified compositions described in the European application is that a relatively large amount of monoamine is necessary for ensuring that the nitrogen contents in the addition products obtained are sufficiently high for, for example, systems initiated by benzophenone. Sufficiently high nitrogen contents are necessary to ensure that in practice the photopolymerization is sufficient and goes to completion at the customary radiation dosage.

EP-A-2,457 describes plastics for molded articles, the plastics curing under elevated temperatures. The plastics are Michael addition products of acrylic ester monomers with amines having an amine hydrogen functionality of at least 3. The components are reacted at an equivalent acrylate/amine hydrogen ratio of 0.5 to 2.0.

Radiation-curable solvent-free compositions based on polyacrylates and mono-, di- or polyamines are disclosed in U.S. Pat. Nos. 4,547,562 and 4,675,374. Species having more than one primary amino group are mentioned as suitable di- and polyamines. The use of these polyamines gives highly crosslinked surface coating compositions of higher molecular weight and thus higher viscosity which, without addition of reactive thinners and solvents, have an application viscosity which is too high or even lead to solid products.

Finally, U.S. Pat. No. 4,045,416 and U.S. Pat. No. 3,845,056 relate to radiation-curable surface coating compositions based on aminoacrylates which are obtained by reaction of polyacrylates with amines having at least one amine hydrogen. Primary and secondary monoamines and polyamines are mentioned as suitable amines. The polyamine components mentioned in the U.S. Patents are polyamines having more than one primary amino group, polyamines having exclusively secondary amino groups or polyamines having secondary and tertiary amino groups. When polyamines having more than one primary amino group are used, the addition products obtained are inhomogeneous and have a short shelf life, while the use of polyamines having exclusively secondary amino groups, such as, for example, piperazine, leads to inhomogeneous mixtures due to insufficient reactivities or incompatibilities. The use of polyamines having secondary and tertiary amino groups only results in a reduction of the acrylic or methacrylic ester functionality of the molecule.

Accordingly, the object of the present invention was to eliminate the disadvantages described above, i.e. to provide radiation-curable binders which have a sufficiently long shelf life and a clear appearance, i.e. are homogeneous, even when tetrafunctional (meth)acrylic esters are used as precursors. The binders should be radiation-curable without using external synergists, for example amines. The binders according to the invention should be low-viscosity oligomers having comparatively good radiation-curability and comparatively good resulting film properties, in particular hardness. The binders should have a low viscosity, so that the use of reactive thinners and organic solvents can be omitted.

The object of the present invention is achieved by addition products of
A) oligomers having at least two acrylic ester and/or methacrylic ester groups per molecule and
B) polyamines,
wherein polyamines B) are diamines having a primary and a tertiary amino group and the ratio of primary amino groups of B) to (meth)acrylic double bonds of A) is 0.01:1 to 0.2:1, preferably 0.03:1 to 0.1:1.

Examples of suitable acrylic and methacrylic esters (A) are esters of acrylic acid or methacrylic acid with dihydric aliphatic alcohols, such as ethylene glycol, 1,2- and 1,3- propylene glycol, 1,4-butanediol, 1,2-pentanediol, neopentylglycol, 1,6-hexanediol, 2-methyl-1,5-pentanediol, 2-ethyl-1,4-butanediol, dimethylolcyclohexane and diethylene glycol, with tri-hydric alcohols, such as glycerol, trimethylolethane, trimethylolpropane and trimethylolbutane, with tetrahydric alcohols, such as pentaerythritol, and with alcohols containing more than 4 hydroxyl groups, such as di(trimethylolpropane), di(pentaerythritol) and sorbitol.

Also suitable are cycloaliphatic alcohols, such as cyclohexanols and 1,4-bis(hydroxymethyl)cyclohexane, araliphatic alcohols, such as 1,3-xylylenediol, and phenols, such as 2,2-bis(4-hydroxyphenyl)propane (bisphenol A).

Esters of acrylic acid and/or methacrylic acid with tri- or tetrahydric alcohols are preferably used as component A).

Before being esterified with acrylic acid or methacrylic acid, the polyhydric alcohols listed above can have been converted into ether alcohols of higher molecular weight by alkoxylation with, for example, ethylene oxide or propylene oxide. This results in polyether acrylates or polyether methacrylates. Polyether (meth)acrylates of this type are particularly preferably used in the addition products according to the invention as component (A).

The hydroxyl-containing polyethers which are esterified with acrylic acid and/or methacrylic acid are obtained by reaction of di- and/or polyhydric alcohols with different amounts of ethylene oxide and/or propylene oxide by well-known methods (see, for example, Houben-Weyl, Volume XIV, 2, Makromolekulare Stoffe II [Macromolecular Substances II], (1963). Polymerization products of tetrahydrofuran or butylene oxide can also be used.

Suitable components A) are also polyester acrylates and/or polyester methacrylates. The polyester (meth)acrylates are prepared by using hydroxyl-containing polyesters (polyester polyols) as the polyhydric alcohols. These can be prepared by esterification of dicarboxylic acids with diols and triols by well-known methods (see, for example, P. J. Flory, J. Am. Chem. Soc. 58, 1877 (1936) and J. Am. Chem. Soc. 63, 3083 (1953).

In some cases, it is particularly advantageous to react an epoxy resin with acrylic acid or methacrylic acid in a stoichiometric amount, relative to the epoxy functionality. Polyglycidyl ethers of bisphenol A are particularly suitable in this respect. Before the reaction, they may also contain a few hydroxyl groups. The reaction with acrylic acid or methacrylic acid leads to further hydroxyl groups. Such polyhydric acrylic esters or methacrylic esters are designated as epoxyacrylates or -methacrylates. The addition of hydroxyl-containing acrylic esters or methacrylic esters, such as hydroxyethyl acrylate or hydroxybutyl acrylate, to isocyanato-containing mono- or oligomers gives the polyurethane acrylates or methacrylates which, like the epoxy (meth)acrylates, can be used as ester component A).

The preparation of polyether acrylates and polyester acrylates is described, for example, in DE-A-3,836,370.

Suitable diamines having a primary and a tertiary amino group (component B)) are N,N-dialkyl-diaminoalkanes, such as, for example, N,N-dimethyl-1,3-diaminopropane, which is obtainable by catalytic hydrogenation of dimethylaminopropionitrile. The preparation of this polyamine is described, for example, in Houben Weyl, Vol. 11/1, 1957, p. 565, in EP-A-316,761 or in P. Lappe, H. Springer and J. Weber, Chem.-Ztg. 111 (4), pp. 117–125 (1987). Further suitable dialkylaminopropanes are N,N-diethyl-1,3-diaminopropane, N,N-di-n-propyl-1,3-diaminopropane, 4-morpholinopropylamine, 3-(N-piperidino)propylamine, N,N-diphenyl-1,3-diaminopropane.

Other suitable components B) of the addition products according to the invention are: N,N-dialkyl-1,2-diaminoethanes, such as dimethylaminoethylamine, diethylaminoethylamine, N-β-aminoethylmorpholine (for preparation, see, for example, Houben Weyl, Vol. 11/1, 1957, p. 563), N,N-dialkyl-1,5-diaminopentanes, which can be prepared by 1,4-addition of secondary amines to 1-cyano-1,3-butadiene to give nitriles, followed by catalytic hydrogenation (for preparation, see Houben Weyl, Vol. 11/1, 1957, p. 276). Examples of suitable N,N-dialkyl-1,5-diaminopentanes are dimethylaminopentylamine, diethylaminopentylamine, 4-morpholinopentylamine.

Particularly good results are obtained by using N,N-dimethyl-1,3-diaminopropane as amine component B).

The ratio of A) to B) is selected in such a manner that the ratio of primary amino groups of B) to the acrylic or methacrylic double bonds of A) is 0.01:1 to 0.2:1. This ratio is preferably 0.03:1 to 0.1:1.

The addition products according to the invention are liquid at room temperature. They are prepared by adding diamines B) in a Michael reaction to an acrylic ester or methacrylic ester A) or to a mixture of these esters. The amine-modified oligomers obtained still contain unreacted acrylic ester and/or methacrylic ester groups and tertiary amino groups.

The addition reaction is exothermic and is carried out in liquid phase at a moderate temperature in the absence of a catalyst. The appropriate amount of diamine (B) is added to ester (A) at room temperature with stirring. The temperature rises to about 40° C. When the reaction is complete, the evolution of heat stops, and the temperature drops. The reaction can be accelerated by increasing the temperature so that at 60° C. it will have subsided after about 12 hours. The viscosity of the mixture obtained is then constant with time.

For reasons of reproducibility, the reaction should go as far to completion as possible, which is achieved at reaction temperatures above 50° C.

In general, the reaction is carried out without solvents, but it is also possible to use solvents, especially in order to meter in solid amines B) as a solution. After Michael addition has taken place, the solvent is removed.

To ensure that no undesirable polymerization takes place during the addition reaction, polymerization inhibitors are usually added to the reaction mixture. Suitable polymerization inhibitors include known products, such as substituted phenols, such as 2,6-di-tert.-butyl-p-cresol, hydroquinones, such as methylhydroquinones, and thio ethers, such as thiodiglycol or phenothiazine.

Accordingly, the present invention also relates to a process for the preparation of the addition products according to the invention, which comprises reacting ester component A) and diamine component B) with one another, if appropriate in an organic solvent, with the use of polymerization inhibitors.

The amine-modified addition products according to the invention obtained from components A) and B) are used as film-forming components in radiation-curable surface coating compositions. Depending on the viscosity of the esters, these radiation-curable surface coating compositions can contain, apart from the amino-modified oligomers according to the invention, further copolymerizable compounds known for being used in radiation-curable surface coating compositions, for example (meth)acrylic esters, in particular methyl (meth)acrylate, ethyl (meth)acrylate, propyl (meth)acrylate, butyl (meth)acrylate, isopropyl (meth)acrylate, isobutyl (meth)acrylate, pentyl (meth)acrylate, isoamyl (meth)acrylate, hexyl (meth)acrylate, cyclohexyl (meth)

acrylate, 2-ethylhexyl (meth)acrylate, octyl (meth)acrylate, 3,5,5-trimethylhexyl (meth)acrylate, decyl (meth)acrylate, dodecyl (meth)acrylate, hexadecyl (meth)acrylate, octadecyl (meth)acrylate, octadecenyl (meth)acrylate and the corresponding esters of malein, fumaric, tetrahydrophthalic, crotonic, isocrotonic, vinylacetic and itaconic acids. Preference is given to the use of monomers having more than 1 double bond per molecule, for example ethylene glycol diacrylate, diethylene glycol diacrylate, propylene glycol diacrylate, trimethylene glycol diacrylate, neopentyl glycol diacrylate, 1,3-butylene glycol diacrylate, 1,4-butylene glycol diacrylate, 1,6-hexamethylene glycol diacrylate, 1,10-decamethylene glycol diacrylate, trimethylolpropane triacrylate, pentaerythritol tetraacrylate and pentaerythritol triacrylate and the corresponding methacrylates. Very particular preference is given to the use of trimethylolpropane triacrylate and acrylic esters of propoxylated trimethylolpropane.

However, addition of these monomeric, copolymerizable compounds (often also called reactive thinners) is in general not necessary, since the amine-modified esters according to the invention have low viscosity.

Depending on the viscosity of the addition products according to the invention, the radiation-curable surface coating compositions can contain water, although addition of water is in general not necessary due to the low viscosity of the film-forming components. The advantage of the addition products described must in particular also be attributed to the fact that they are dispersible in water, i.e. the use of organic solvent can be entirely omitted.

The addition products obtained from A) and B) contained in the radiation-curable surface coating compositions are water-soluble or water-dispersible by virtue of the tertiary amino groups contained therein. These groups can be converted to the charged groups by reacting at least some of them with acids. Examples of acids which are suitable for neutralizing the basic groups are lactic acid, acetic acid, formic acid and phosphoric acid.

The radiation-curable surface coating compositions additionally contain photoinitiators commonly used in radiation-curable surface coating compositions, for example benzophenones, benzoins or benzoin ethers. The use of synergists can be omitted, since the esters contained in the surface coating compositions are amine-modified and thus exhibit a synergistic action.

The radiation-curable compositions according to the invention can contain, apart from the amine-modified reaction products obtained from esters A) and diamines B), further photopolymerizable binders, which may also be amine-modified. Examples which are suitable as such further amine-modified binders are the radiation-curable binders disclosed in EP-A-280,222 and in U.S. Pat. Nos. 4,045, 416, 4,547,562 and 4,675,374. Suitable non-amine-modified further binders are the polyether acrylates, polyether methacrylates, polyester acrylates, polyester methacrylates, urethane acrylates, urethane methacrylates, epoxy acrylates and epoxy methacrylates described above as example for component A).

If desired, the radiation-curable surface coating compositions according to the invention contain customary auxiliaries and additives, for example extenders, such as talc, heavy spar, aluminum silicates, dolomite, antifoams, flow-improving agents and film-forming aids, for example cellulose derivatives, and flatting agents in the usual amounts.

The surface coating compositions can be applied to the substrate, preferably to wood, woodbase materials or paper, by spray-coating, roller-coating, flow-coating, dip-coating, knife-coating, brush-coating, pouring or by Vakumat application.

Curing of the coating films takes place immediately after application or after evaporation of any water present by means of UV or electron beams. The equipment and conditions for these curing methods are known from the literature (see, for example, R. Holmes, U.V. and E.B. Curing Formulations for Printing Inks, Coatings and Paints, SITA-Technology, Academic Press, London, United Kingdom 1984, pages 79–111) and need no further description.

The surface coating compositions according to the invention are also suitable as printing inks.

The radiation-curable surface coating compositions according to the invention or the amine-modified esters obtained from components A) and B) have an excellent shelf life. The amine-modified esters are homogeneous, have a clear appearance, good radiation curability, and the films obtained therefrom after radiation curing possess excellent properties. While having a comparable nitrogen content and comparable reactivity towards radiation, the amine-modified esters according to the invention have lower viscosity than the amine-modified esters according to EP-A-280,222. The films obtained are distinguished by excellent transparency.

Below, the invention is illustrated in more detail by way of exemplary embodiments. Parts are by weight, unless stated otherwise:

EXAMPLES

To prepare ester component A), polyether acrylates are prepared from acrylic acid and trimethylolpropane alkoxylated with propylene oxide and from pentaerythritol alkoxylated with ethylene oxide in the presence of acrylic acid (polyether acrylate precursor). Preparation takes place in a reactor of batch size 3 to 10 kg which is equipped with stirrer, air feed, temperature sensor and oil jacket heating. Esterification takes place at 130° C. with acid catalysis (0.5% of methanesulfonic acid, relative to the starting materials) using 2% of cyclohexane as entrainer and hydroquinone and hypophosphorous acid as stabilizers (0.2% by weight of hydroquinone and 0.05% by weight of hypophosphorous acid, relative to the starting materials) until an OH group conversion of at least 85% is reached. Residual acrylic acid and residual entrainer are then removed in vacuo until the acid number has reached a value of $\leq 4$ mg of KOH/g and the solids content (1 h, 130° C.) is at least 98%. Adduct formation with amine component B) is carried out at 60° C. in a nitrogen atmosphere using 0.1% of 2,6-di-tert.-butyl-p-cresol as stabilizer (polymerization inhibitor) until a viscosity is reached which remains constant over a period of 2 hours.

In this reaction, amine component B) is metered into the initially introduced ester component A) over a period of 0.5 to 1.0 h. If piperazine is used, it is added as a powder which slowly dissolves. (Comparative Examples C1–2 and C2–3).

The table below lists the composition and properties of addition products according to the invention obtained from A) and B) (E1 to E3) and those of known addition products obtained from A) and primary and secondary monoamines and disecondary diamines as comparison (C1–C3).

| Example | E1 | C1-1 | C1-2 | E2 | C2-1 | C2-2 | C2-3 | E3 | C3-1 | C3-2 |
|---|---|---|---|---|---|---|---|---|---|---|
| Acrylic esters: moles of starting materials | | | | | | | | | | |
| Trimethylolpropane, 5.3 mol of propylene oxide per mole of trimethylolpropane (MW = 433) | 1.00 | 1.00 | 1.00 | | | | | 0.65 | 0.65 | 0.65 |
| Pentaerythritol, 5.0 mol of ethylene oxide per mole of pentaerythritol (MW = 356) | | | | 1.00 | 1.00 | 1.00 | 1.00 | 0.35 | 0.35 | 0.35 |
| Acrylic acid | 3.60 | 3.60 | 3.60 | 4.80 | 4.80 | 4.80 | 4.80 | 4.02 | 4.02 | 4.02 |
| Viscosity (orig., 23° C.) \|mPas\| | 160 | 160 | 160 | 200 | 200 | 200 | 200 | 170 | 170 | 170 |
| Viscosity (orig.) DIN 4 \|s\| | | | | 43* | 43* | 43* | 43* | | | |
| Color number (Gardner) | 2 | 2 | 2 | 1 | 1 | 1 | 1 | 2 | 2 | 2 |
| Modification \|% by weight\|** | | | | | | | | | | |
| Monoethanolamine | | 4.36 | | | 4.36 | | | | 2.18 | |
| Dimethylaminopropylamine | 1.83 | | | 3.64 | | | | 1.83 | | |
| Dibutylamine | | | | | | 9.21 | | | | 4.61 |
| Piperazine | | | 1.53 | | | | 3.07 | | | |

*: slight structural viscosity
**: % by weight of acrylic ester + % by weight of amine = 100% by weight

| Example | E1 | C1-1 | C1-2 | E2 | C2-1 | C2-2 | C2-3 | E3 | C3-1 | C3-2 |
|---|---|---|---|---|---|---|---|---|---|---|
| Characteristic numbers | 265 | 1660 | about 2.3 dPas | 630* | 2160* | 210* | not determinable | 415 | 530 | 185 |
| Viscosity (orig., 23° C.) \|mPas\| | | | | | | | | | | |
| Viscosity (orig.) DIN 4 \|s\| | 73 | 470 | not determinable | 180 | 450 | 45 | not determinable | 123 | 136 | 49 |
| Color (visually) | light yellow | light yellow | | light yellow | light yellow | light yellow | | light yellow | white | pink |
| Appearance (cloudy/clear) | transparent | transparent | cloudy precipitate | transparent | cloudy | transparent | cloudy precipitate | slightly opaque | emulsionlike | transparent |
| Double bond content of the non-amine-modified precursor \|mol of C=C /kg of precursor\| | 3.8 | 3.8 | 3.8 | 5.9 | 5.9 | 5.9 | 5.9 | 4.7 | 4.7 | 4.7 |
| Nitrogen content of the Michael addition product \|% by weight\| | 0.50 | 1.00 | 0.50 | 1.00 | 1.00 | 1.48 | 1.00 | 0.50 | 0.50 | 0.74 |
| Ratio of primary or secondary amino group of B) to (meth)acrylic double bonds of A) | 0.048 | 0.196 | 0.095 | 0.063 | 0.126 | 0.196 | 0.125 | 0.039 | 0.078 | 0.118 |

*: slight structural viscosity

Testing of the addition products

1. Pendulum damping (König, [s]) of the examples and comparative examples as a function of relative radiation dosage A 40 μm thick (wet film thickness) coating on glass is prepared from 91.6 parts of the addition products or precursors, 3.4 parts of a conventional flatting agent and 5 parts of benzophenone by drawing down. The glass plates are cured under a mercury medium-pressure lamp (80 watt/cm, distance: 20 cm) at variable speeds of 10–40 m/min (relative doses=1.0≙a feed of 10 m/min; relative doses 1.0≙a feed of 4×40 m/min; relative doses=4≙4×10 m/min and relative doses=0.25≙1×40 m/min). The pendulum hardnesses of the tack-free films are determined by the method of König.

| Example/doses | 0.25 | 0.33 | 0.5 | 0.66 | 0.75 | 0.99 | 1 | 1.32 | 2 | 3 | 4 |
|---|---|---|---|---|---|---|---|---|---|---|---|
| E1 Precursor | | | | | | | 0 | | 45 | 58 | 82 |
| E1 | | 26 | | 42 | | 53 | | | 55 | 63 | |
| C1 | 33 | | 47 | | 47 | | | | 63 | 63 | |
| E2 | | | | | | | | 77 | | | |

-continued

| Example/doses | 0.25 | 0.33 | 0.5 | 0.66 | 0.75 | 0.99 | 1 | 1.32 | 2 | 3 | 4 |
|---|---|---|---|---|---|---|---|---|---|---|---|
| Precursor E2 | 48 | | 63 | | 74 | | 89 | | 112 | 120 | |
| C2-1 | 45 | | 57 | | 68 | | 84 | | 101 | 111 | |
| C2-2 | 50 | | 71 | | 89 | | 99.5 | | 120 | 124 | |
| E3 | | | | | | | 0 | | 77 | 106 | 141 |
| Precursor E3 | 0 | | 55 | | 56 | | 56 | | 86 | 98 | |
| C3-1 | 0 | | 54 | | 55 | | 55 | | 88 | 105 | |
| C3-2 | 0 | | 48 | | 47 | | 48 | | 78 | 106 | |

2. Shelf life

The shelf life of the addition products at 50° C. is determined.

Oven specimens (50° C.): change in viscosity with time (orig.) DIN 4 |s|

| | 5 days | 10 days | 30 days | 120 days | Note |
|---|---|---|---|---|---|
| E1 | 73 | 74 | 73 | 75 | |
| C1 | 470 | 470 | 475 | 570 | |
| E3 | 123 | 123 | 125 | | |
| C3-1 | 136 | 150 | 170 | | 20 days: 2 phases |
| C3-2 | 49 | 52 | 54 | | |

We claim:

1. Radiation curable addition products of
   A) oligomers having at least two acrylic ester and/or methacrylic ester groups per molecule, said oligomers being selected from the group consisting of esters of acrylic acid, esters of methacrylic acid, polyether acrylates, polyether methacrylates, polyester acrylates, polyester methacrylates, epoxy acrylates and epoxy methacrylates, polyurethane acrylates and polyurethane methacrylates, and mixtures thereof, and
   B) polyamines, wherein the polyamines are diamines having a primary and a tertiary amino group and the ratio of primary amino groups of B) to (meth)acrylic double bonds of A) is 0.01:1 to 0.2:1, and wherein the addition product is liquid at room temperature.

2. Addition products as claimed in claim 1, wherein component A) is selected from the group consisting of esters which are the reaction products of acids and alcohols, wherein the acids and alcohols are selected from the group consisting of acrylic acid, methacrylic acids tri-hydric alcohols, tetrahydric alcohols and mixtures thereof.

3. Addition products as claimed in claim 2, wherein component A is selected from the croup consisting of polyether acrylates, polyether methacrylates and mixtures thereof.

4. Addition products as claimed in claim 1 to 3, wherein N,N-dimethyl-1,3-diaminopropane is used as component B).

5. A process for the preparation of the addition products as claimed in claim 1, which comprises reacting component A) and polyamines B) with one another, with the use of polymerization inhibitors.

6. Radiation-curable surface coating compositions, comprising a radiation curable binder and photoinitiators, wherein the radiation curable binder comprises the addition product of
   A) oligomers having at least two acrylic ester and/or methacrylic ester groups per molecule, said oligomers being selected from the group consisting of esters of acrylic acid, esters of methacrylic acid, polyether acrylates, polyether methacrylates, polyester acrylates, polyester methacrylates, epoxy acrylates and epoxy methacrylates, polyurethane acrylates and polyurethane methacrylates, and mixtures thereof, and
   B) polyamines, wherein the polyamines are diamines having a primary and a tertiary amino group and the ratio of primary amino groups of B) to the double bonds of A) is 0.01 to 0.2.

7. A coated substrate comprising a substrate selected from the group consisting of wood, woodbase materials and paper coated with the radiation-curable surface coating compositions as claimed in claim 6.

8. A process for the preparation of the addition products as claimed in claim 5, wherein the reaction takes place in an organic solvent.

9. The coating composition of claim 6, further comprising compounds selected from the group consisting of ethylenically unsaturated, photopolymerizable compounds, further radiation-curable binders, further customary auxiliaries and additives, water and neutralizing agents.

* * * * *